United States Patent [19]

Briggs et al.

[11] Patent Number: 5,249,295
[45] Date of Patent: Sep. 28, 1993

[54] DIGITAL COMPUTER REGISTER ALLOCATION AND CODE SPILLING USING INTERFERENCE GRAPH COLORING

[75] Inventors: Preston P. Briggs; Keith D. Cooper; Kenneth W. Kennedy, Jr.; Linda M. Torczon, all of Houston, Tex.

[73] Assignee: Rice University, Houston, Tex.

[21] Appl. No.: 27,937

[22] Filed: Mar. 8, 1993

Related U.S. Application Data

[63] Continuation of Ser. No. 541,888, Jun. 20, 1990, abandoned.

[51] Int. Cl.$^5$ ............................................. G06F 12/08
[52] U.S. Cl. .............................. 395/650; 364/DIG. 2; 364/964.0; 364/964.5; 364/964.2; 364/926.5
[58] Field of Search ................ 395/650; 386/DIG. 2, 386/964.0, 964.5, 964.2, 926.5

[56] References Cited

U.S. PATENT DOCUMENTS 4,571,678  2/1986  Chaitin .................................. 364/300

OTHER PUBLICATIONS

Preston Briggs, Keith D. Cooper, Ken Kennedy, and Linda Torczon, "Coloring Heuristics for Register Allocation", *Proceedings of the SIGPLAN '89 Conference on Programming Language Design and Implementation*, ACM Press, vol. 24, No. 7, Jul. 1989, pp. 275–284.
Preston Briggs, Keith D. Cooper, and Linda Torczon, "Coloring Register Pairs", *ACM Letters on Programming Languages and Systems*, ACM Press, vol. 1, No. 1, Mar. 1992, pp. 3–13.
Preston Briggs, "Register Allocation Via Graph Coloring—A Thesis Submitted in Partial Fulfillment of the Requirements for the Degree of Doctor of Philosophy", published by the Center for Research on Parallel Computation, CPRC-TR92218, Apr. 1992.

*Primary Examiner*—Gareth D. Shaw
*Assistant Examiner*—A. Katbab
*Attorney, Agent, or Firm*—Arnold, White & Durkee

[57] ABSTRACT

A method is disclosed for allocating internal machine registers in a digital computer for use in storing values defined and referenced by a computer program. An allocator in accordance with the present invention constructs a interference graph having a node therein for the live range of each value defined by a computer program, and having an edge between every two nodes whose associated live ranges interfere with each other. The allocator models the register allocation process as a graph-coloring problem, such that for a computer having R registers, the allocator of the present invention iteratively attempts to R-color the interference graph. The interference graph is colored to the extent possible on each iteration before a determination is made that one or more live ranges must be spilled. After spill code has been added to the program to transform spilled live ranges into multiple smaller live ranges, the allocator constructs a new interference graph and the process is repeated.

8 Claims, 6 Drawing Sheets

DIGITAL COMPUTER REGISTER ALLOCATION AND CODE SPILLING USING INTERFERENCE GRAPH COLORING

This application is a continuation of application Ser. No. 07/541,888, filed Jun. 20, 1990, now abandoned.

FIELD OF THE INVENTION

This invention relates to the field of digital computers, and more particularly relates to a method for allocating the register usage of a program executing on a computer.

BACKGROUND OF THE INVENTION

In general, a digital computer is an apparatus for performing arithmetic and other computational operations on data stored in the form of binary information in the computer's memory. Frequently, a computer's memory is hierarchically organized; that is, a computer may have a large amount of primary or main memory for storing data and computer instructions, and possibly one or more levels of smaller and faster cache memory modules, for storing more frequently accessed data and instructions stored in main memory. The central processing unit (CPU) of a digital computer fetches computer instructions comprising a computer program from its memory, and performs operations on data in accordance with those instructions. Typically, the data being operated on by a CPU must first be copied or moved into the CPU's internal registers. Once a specified computation has been performed on data in the CPU's registers, the result may be retained in the register, or returned to cache or main memory.

Such a hierarchical memory system is characterized by having memory modules with slower access times near the bottom of the hierarchy, with progressively faster memories higher in the hierarchy. Frequently accessed memory locations are copied into faster cache memories higher in the hierarchy, so that less time is required to load the contents of those memory locations into the CPU's registers, when necessary to perform a computation specified by a program. Main memory is at the lower end of the memory hierachy having relatively slow access times. If the amount of main memory available is insufficient, data may be stored in a mass-storage device, such as a hard disk drive or the like, and brought into main memory or elsewhere in the memory hierarchy when needed; in that case, the mass storage device could be viewed as the lowest level of the memory hierarchy. Internal registers of a CPU are at the top of the hierarchy, since once a piece of data is stored in a CPU register, the CPU may utilize that data without fetching it from memory. Ideally, all data accessed by a computer would be stored in CPU registers; however, the amount of CPU register storage is usually limited to less than 128 bytes or so, while the total amount of memory accessible to the CPU must be extremely large, on the order of many millions of bytes.

As a consequence of the limited number of CPU registers available, it is necessary that data to be manipulated by the CPU be stored lower in the memory hierarchy during some portions of program execution, and transferred into the CPU registers when an operation involving that data is to be performed. When a data word is stored in a CPU register, it is often the case that data already stored in that register must first be removed from the register and stored at some lower point in the memory hierarchy, such as in a cache, in main memory, or even on a mass storage device, as previously described.

Naturally, the speed of execution of a computer program is dependent upon how long is required to access the data being operated on. As the processing speeds of modern computers have increased dramatically, often the time required to access data on which a computer will operate is the limiting factor in the overall processing speed of the system. Keeping frequently accessed data in higher-level cache memories reduces the amount of memory access time consumed during execution of a program, thereby enhancing execution efficiency. However, swapping data into and out of the CPU's internal registers is usually unavoidable, especially in long, complex programs, or where the number of values manipulated in the course of program execution exceeds the number of available internal CPU registers.

As a result of such considerations, the allocation of registers to particular values during program execution can have a significant impact upon the execution efficiency. If a frequently manipulated value is not stored in a CPU's register, the CPU must wait for access to a lower-level memory before operating on that value, and execution efficiency will suffer. On the other hand, if an infrequently-used value is stored in a register even during portions of program execution in which it is not referenced, this prevents the register from being allocated to a more-frequently referenced, or currently active value, also causing a decrease in execution efficiency.

There has been shown in the prior art a technique in which register allocation is treated as a graph-coloring problem. Each node in the graph represents a value that is stored in a CPU register, and two nodes of the graph are connected by an edge if the values "interfere" with each other. As is well known to those of ordinary skill in the art (see, e.g., U.S. Pat. No. 4,571,678 to Chaitin), two values are said to interfere with one another if they are different, and one is alive at the definition of the other. For the purposes of this description, a value is deemed to be "live": (1) if it has been computed or defined, and (2) the value will be subsequently be used in a computation before being re-computed or redefined. The period of time during program execution between when a value becomes alive and when it is no longer live is called the "live range" of that value.

As one skilled in the field of computer science will appreciate, the coloring of a graph is an assignment of a color to each of the nodes in the graph such that if two nodes are adjacent (i.e. connected by an edge of the graph), then they are assigned different colors. A coloring of a given graph is said to be an N-coloring if it does not use more than N different colors. The chromatic number of a graph is defined to be the minimal number of colors in any of its colorings, that is the least N for which the graph may be N-colored.

According to the present invention, all of the live ranges of a program are represented by nodes in a graph, called an interference graph, in which each edge represents an interference between two live ranges. In this way, if two live ranges exist at a single point in the program, there is an edge between their nodes in the interference graph. If a node has N neighbors, that node is said to be of degree N. Register allocation schemes in the prior art have attempted to color the interference graph with K colors, where K is the number of CPU registers available. If a K-coloring is found, each register is assigned a color, and live range nodes of that color are stored in the corresponding register during program execution.

If a K-coloring does not exist for a given interference graph, code must be added to the program to "spill38 one or more live ranges; that is, provisions must be made for certain values to be removed from registers during portions of program execution, and reloaded when such values are again referenced. This has the effect of eliminating the spilled live range and creating a new, small live range around each individual use or definition of that value within the program. This transforms the interference graph into one having additional nodes, but possibly fewer edges, and hopefully fewer interferences. Then the register allocation scheme will attempt to K-color the new interference graph. This iterative process of spilling and attempting to K-color the graph continues until a K-colorable graph is found.

It is widely known in the field of computer science that the problem of obtaining a minimal graph coloring is among a class of so-called nondeterministic polynomial-time complete (NP-complete) problems which can take time to solve that is exponentially proportional to the size of the graph. It is widely believed that the problems in the NP-complete class are incapable of being solved in time proportional to a polynomial function of the size of the problem; indeed no polynomial-time bounded solution to an NP-complete problem has yet been found. From the standpoint of register allocation, such exponential performance is clearly undesirable, since this would lead to impractical time for allocation, and thus for the whole compilation process It has been proposed in the prior art, however, that the NP-completeness of graph coloring is not an insurmountable obstacle to a register allocation scheme based on graph coloring. In the prior art, certain heuristic approaches have led to graph-coloring-type register allocation schemes which take time linear in the size of the interference graph. One such scheme for coloring an interference graph is based on the principle that in order to obtain a K-coloring of graph G, if a node N has less then K neighbors, then no matter how the neighbors are colored there is necessarily one of the K colors left for node N; thus node N can be thrown out of the graph G. The problem of obtaining a K-coloring of G is therefore recursively reduced to the problem of obtaining a K-coloring of a graph G', where G' has one less node, and probably several edges less than graph G.

In practice, this method of the prior art has three phases: First, in Phase One, an interference graph is constructed, with one node for each live range and one edge for each interference. In Phase Two, the graph is simplified; this is accomplished by removing one at a time each node N with degree less than the number of CPU registers, along with all of its edges, and placing the node N in a stack; if the allocator reaches a state where all remaining nodes have degree greater than or equal to K, it must select a node to spill. Using some metric, it chooses a node to spill, removes it from the graph, records that this node will be spilled, then continues with Phase Two. For the node that is to be spilled, the original program must be modified to include program steps, called spill code, which instruct the computer to store the spilled value to memory after definition, and restore the value to a register before its subsequent use in the program. Once the allocator has modified the program in this manner, i.e., by inserting spill code, it goes back to Phase One, build the interference graph for the modified program, and attempts to find a K-coloring for this new graph. When the allocator has modified the program enough so that it finds a K-coloring, it proceeds to Phase Three. In Phase Three of the prior art scheme, colors are assigned to the nodes in the stack.

The prior art scheme is an iterative scheme in the sense that the entire process of building the interference graph, simplifying it, and inserting the spill code is repeated until a coloring can be achieved for the number of CPU registers. In Phase Two, the register allocator must decide which nodes with degree greater than the number of CPU registers to spill. In the prior art, it is suggested that the node with the lowest ratio of spill cost to degree should be spilled. For a live range, the spill cost may be defined as the number of additional cycles that would be required to save and restore the live range. Alternatively, the spill cost can be estimated to be the number of loads and stores that would have to be inserted in the program, weighted by the loop nesting depth of each insertion point. The spill cost may be precomputed for each node, such that when the register allocator reaches the point where it must choose a node to spill, it divides the precomputed spill cost by the node's current degree.

Once the necessary spill code has been inserted in the program, the actual coloring occurs in the third phase. In Phase Three, the register allocator removes a node from the top of the stack created in phase 2 and re-inserts it in the graph, along with all of its edges; this node is then assigned a color different from each of its neighbors. It has been shown in the prior art that this color process must succeed, given the work done in Phase Two. However, this prior art scheme is known to not be guaranteed to find the minimal coloring for a given interference graph.

It is accordingly a feature of the present invention to provide a technique for allocation of CPU registers during program execution which improves the execution efficiency of the program; such improvement arises from the reduction of instances in which a value stored low in the memory hierarchy must be fetched from its place in memory and loaded into a CPU register. Such improvement also results in a minimization or reduction of the number of times that a given value must be removed from a CPU register in order to make room for another value, and later restored in a CPU register.

It is another feature of the present invention to provide a technique for register allocation which itself does not consume an impractically large amount of pre-execution overhead or processing time. In particular, it is an object of the present invention to provide a register allocator whose execution time is asymptotically bounded by a function linear in the size of a program's interference graph.

A further feature of the present invention is to provide an improved register allocation scheme which increases the number of graphs for which the allocator finds a coloring that will fit in the number of registers provided by the machine.

Still another feature of the present invention is to provide a register allocator which performs effectively on graphs arising from real programs, as opposed to arbitrary or randomly generated graphs.

Yet another feature of the present invention is to provide a register allocator which makes decisions to spill live ranges based on non-arbitrary criteria.

SUMMARY OF THE INVENTION

The foregoing and other features of the present invention are achieved through the use of a register allocator which, rather than removing nodes with degree strictly less than the number of CPU registers in arbitrary order, instead removes the nodes in order from the lowest current degree to the highest. As is hereinafter explained, this method is polynomially bounded in execution time, and avoids unnecessary spills by postponing spill decisions until after the interference graph is colored, rather than before.

In one embodiment of the invention, a novel "compiler storage device" (e.g., a ROM, a floppy disk, or a tape, not shown in the Figures) is interfaceable with a programmable computer. The computer reads a program of instructions tangibly embodied in the compiler storage device and executes the instructions to perform the method described and claimed herein.

In another embodiment, a novel "compiled-program storage device" (e.g., a ROM, a floppy disk, or a tape, not shown in the Figures) is interfaceable with a programmable computer. The computer (also not shown in the Figures) reads a program of instructions tangibly embodied in the compiled-program storage device and executes the instructions therein. The compiled-program storage device is itself created by generating the program of instructions in accordance with the method described and claimed herein and writing the program of instructions to the storage device.

In still another embodiment, a novel computing machine (not shown in the Figures) is created by operating a programmable computer to read a program of instructions from a compiled-program storage device of the kind described above.

BRIEF DESCRIPTION OF THE DRAWINGS

These and other features of the present invention will be best understood with reference to the detailed description of a specific embodiment of the present invention which follows, when read in conjunction with the accompanying drawings, wherein.

DETAILED DESCRIPTION OF A SPECIFIC EMBODIMENT

Figure 1:
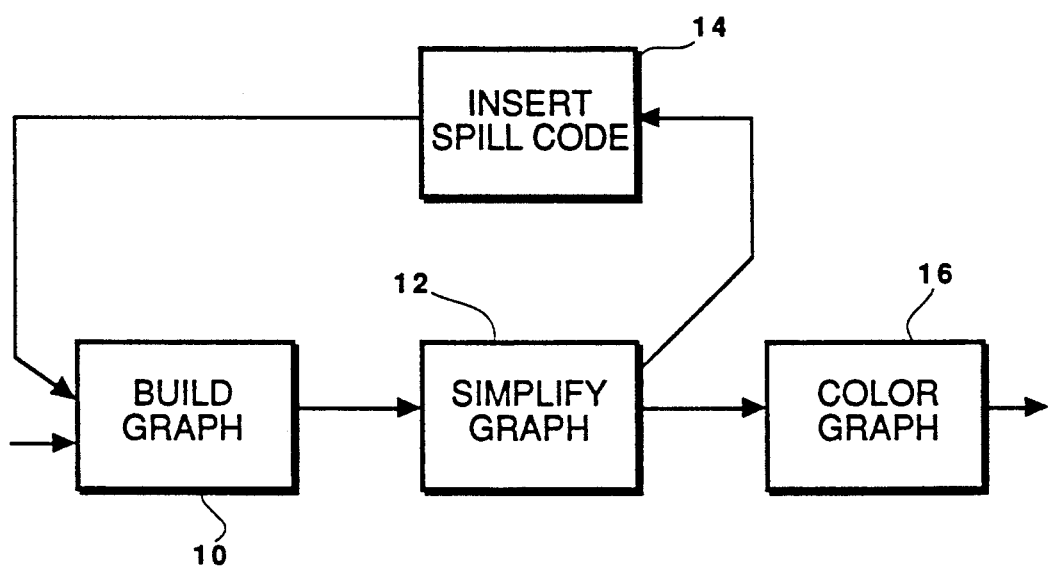
FIG. 1 is a flow diagram of a prior art register allocation scheme.

In FIG. 1, a flow diagram illustrating a register allocation scheme of the prior art is shown. In the first step of the prior art allocation scheme, denoted by block 10 in FIG. 1, the register allocator builds an interference graph for the program as previously described, having one node for each live range, and one edge for each interference. Block 10 in FIG. 1 corresponds to Phase One of the prior art method.

In block 12 of FIG. 1, the interference graph constructed in block 10 is simplified. This simplification process consists of two steps, which are repeated until the graph is empty:

(1) If there exists a node N with degree less than K (where K is the number of CPU registers), remove node N and all of its edges from the graph. Place N on a stack for coloring.

(2) Otherwise, choose a node N with degree greater than or equal to K to spill; remove node N and all of its edges from the graph, and mark node N to be spilled.

If any node is marked in Phase Two for spilling, instructions must be inserted into the program to spill the live range; that is, spill code must be added to the program to store the spilled value to memory following each definition, and restoring that value before it is used in the program. This step is represented by block 14 of FIG. 1. Since the spill code inserted in block 14 may itself involve register usage, the spill code itself may induce additional spilling. For this reason, the register allocator must repeat the steps of blocks 10 and 12 of FIG. 1 each time spill code is added, until no additional live ranges must be spilled.

Once all the spill code has been inserted, the actual coloring is performed by the register allocator in Phase Three, represented in FIG. 1 by block 16. The coloring phase is driven by the stack constructed in Phase Two. While the stack is non-empty, the register allocator performs the following steps in Phase Three:

(1) Remove node N from the top of the stack and reinsert it into the graph, along with its edges.

(2) Assign to node N a color that differs from all of its neighbors in the graph.

As previously noted, this coloring process in block 16 must succeed; this fact in ensured by the simplification step 12.

Figure 2:
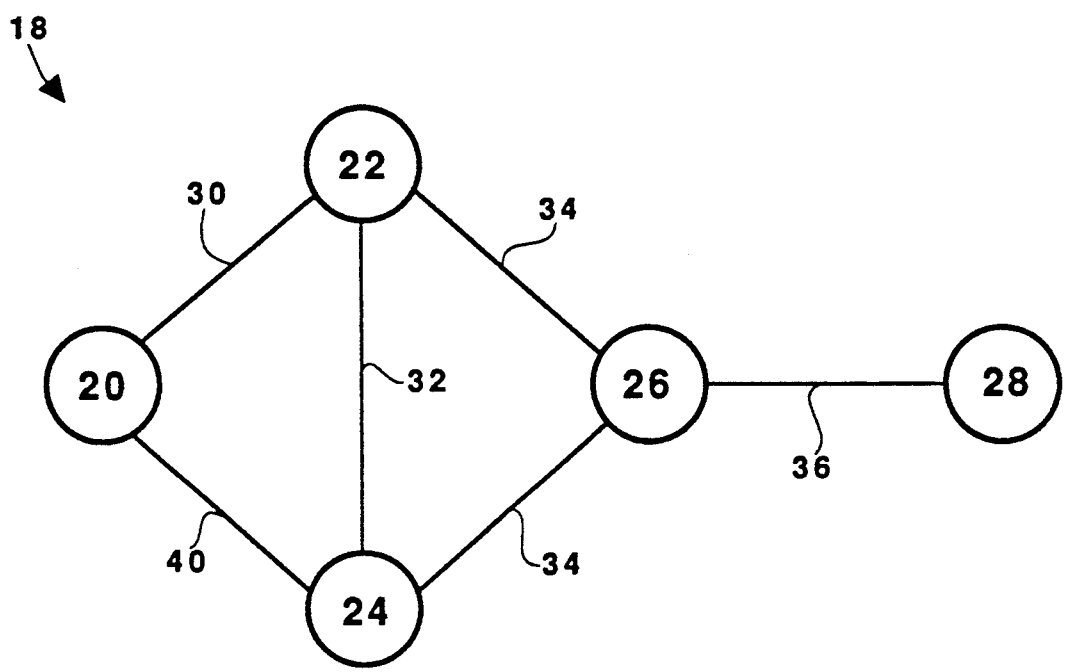
FIG. 2 is an interference graph representing register usage in a computer.

In FIG. 2, a simple interference graph 18 is shown comprising five nodes, designated as 20, 22, 24, 26, and 28; and six edges, designated as 30, 32, 34, 36, 38, and 40. As an illustrative example of the operation of the prior art method of register allocation, consider attempting to obtain a three-coloring of the graph 18 of FIG. 2 In the simplification step (block 12) of FIG. 1, each of the nodes with degree less than three is removed. One possible sequence of removal, which results in no nodes being marked for spilling, is as follows: First, node 20, along with edges 30 and 40, is removed. Node 20 need not be marked for spilling, since it is of degree two. Next, node 24 may be removed, since after removal of edge 40 associated with node 20, the degree of node 24 was reduced from three to two; edges 32 and 34 are removed along with node 24. Next, node 22, now of degree one, can be removed, along with edge 34. Then, node 26, also now of degree one, can be removed, along with edge 36. This leaves node 28, now of degree 0, which goes on top of the stack of nodes to be colored. In the sequence just described, no node was removed while its degree was greater than two, so no spill code is required, and block 14 of FIG. 1 is not entered.

Next, the coloring phase of the prior art scheme (block 16 in FIG. 1) reinserts the nodes into the graph of FIG. 2, in reverse order of their removal, as colors are assigned to them. Node 28, on top of the stack, is inserted first, and may be assigned any color, for example red. Next, node 26 is added; node 26 may be assigned any color except red, for example blue. Next, node 22 is reinserted, and assigned some color besides blue, for example green. Next, node 24 is inserted; node 24 must be assigned some color besides green and blue, since these are the colors of its neighbors, nodes 22 and 26, respectively. Thus node 24 is assigned the color red. Lastly, node 20 is reinserted, and assigned a color besides those of its neighbors, for example blue.

As previously noted, one shortcoming of this prior art scheme is that it is not guaranteed to find a minimal coloring; that is, it is not certain that the prior art method will find the K-coloring for a graph G having chromatic number K. As an illustration of this shortcoming, consider the simple interference graph 42 of FIG. 3. If the prior art register allocator was attempting to find the two-coloring of graph 42, it would begin by attempting to remove any node of degree less than two. However, as can be seen from FIG. 3, each of the four nodes 44, 46, 48, and 50 are of degree equal to two. Thus, the prior art allocator begins by removing a node for spilling. Assuming that all spill costs are equal, the decision as to which node to remove is inconsequential. Thus, for example, the allocator may designate node 50 for spilling, and remove it, along with edges 56 and 58 from graph 42. Phase Two (block 12 of FIG. 1) will now remove the remaining three nodes 46, 48, and 44, in that order, without further spilling. Since node 50 was designated for spilling, spill code would be inserted (in block 14 of FIG. 1), the interference graph rebuilt (in block 10 of FIG. 1), and re-simplified (in block 12 of FIG. 1).

Figure 3:
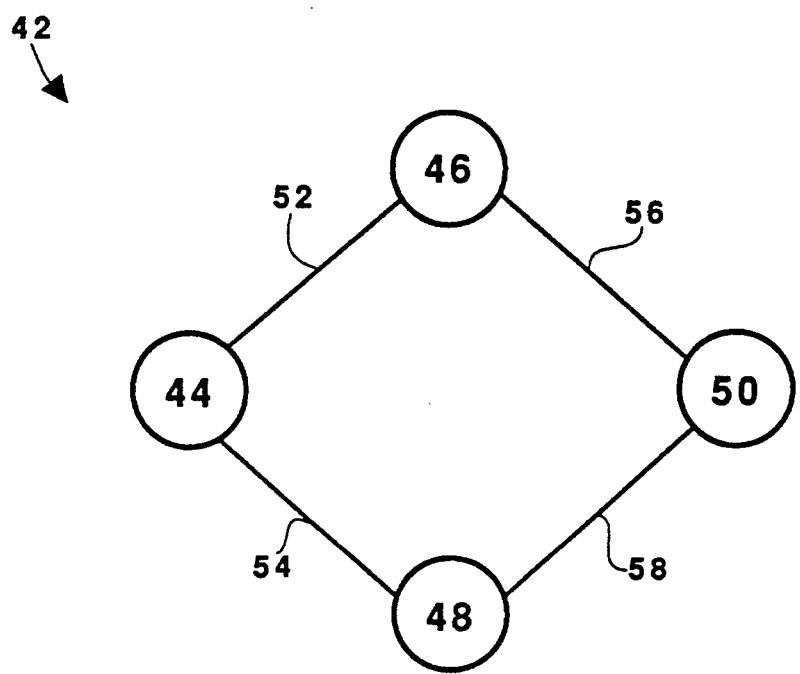
FIG. 3 is another interference graph representing register usage in a computer.

Notice, however, that graph 42 of FIG. 3 may indeed be two-colored, in spite of the prior art allocator's failure to obtain a two-coloring. Nodes 46 and 48 may be colored the same, and nodes 44 and 50 may be colored the same, with no interference.

Figure 4:
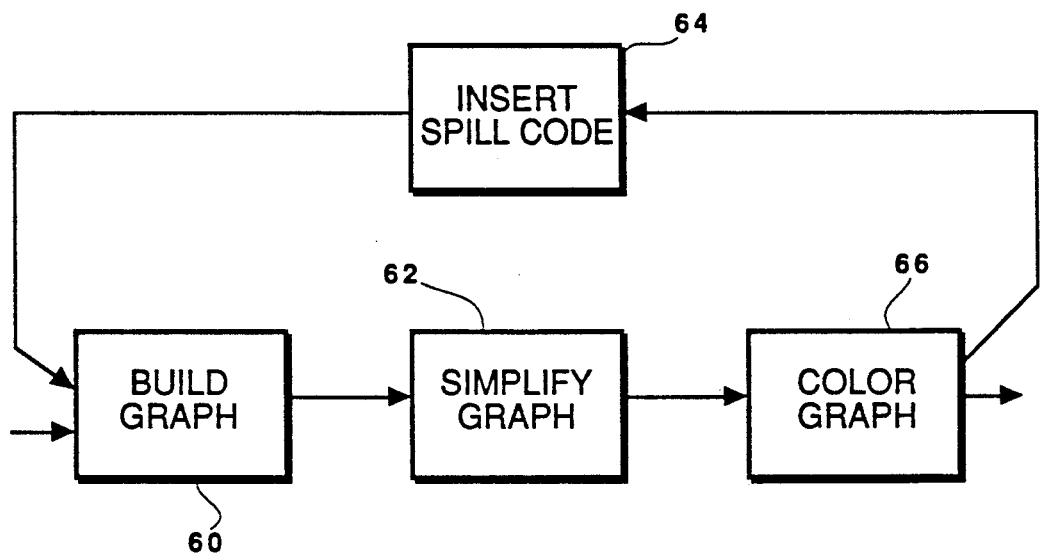
FIG. 4 is a flow diagram of a register allocation scheme in accordance with the present invention.

Turning now to FIG. 4, a flow diagram illustrating the register allocation scheme of the present invention is shown. The approach depicted in FIG. 4 is similar to that of FIG. 1, and begins with the steps of building the interference graph in block 60 and simplifying the graph in block 62. However, the simplification performed in block 62 differs from the simplification performed in the prior art, and consists of the following steps:

(1) Let N be an array, such that N[j] is the first element of a linked list of nodes that have j neighbors. If there are no such nodes, N[j] is null.
(2) Let the interference graph be represented by nodes, each of which is on some list in N, and edges represented by an adjacency list, which is a list of pairs of nodes (a,b) such that there is an edge between node a and node b.
(3) At each stage, search N from the beginning until the first non-null cell N[j] is found. Remove from the graph the element at the head of the list beginning at N[j], and move each of its neighbors down one cell in N, reflecting the fact that each of the neighbors has one fewer neighbor once the node is removed.

Figure 6:
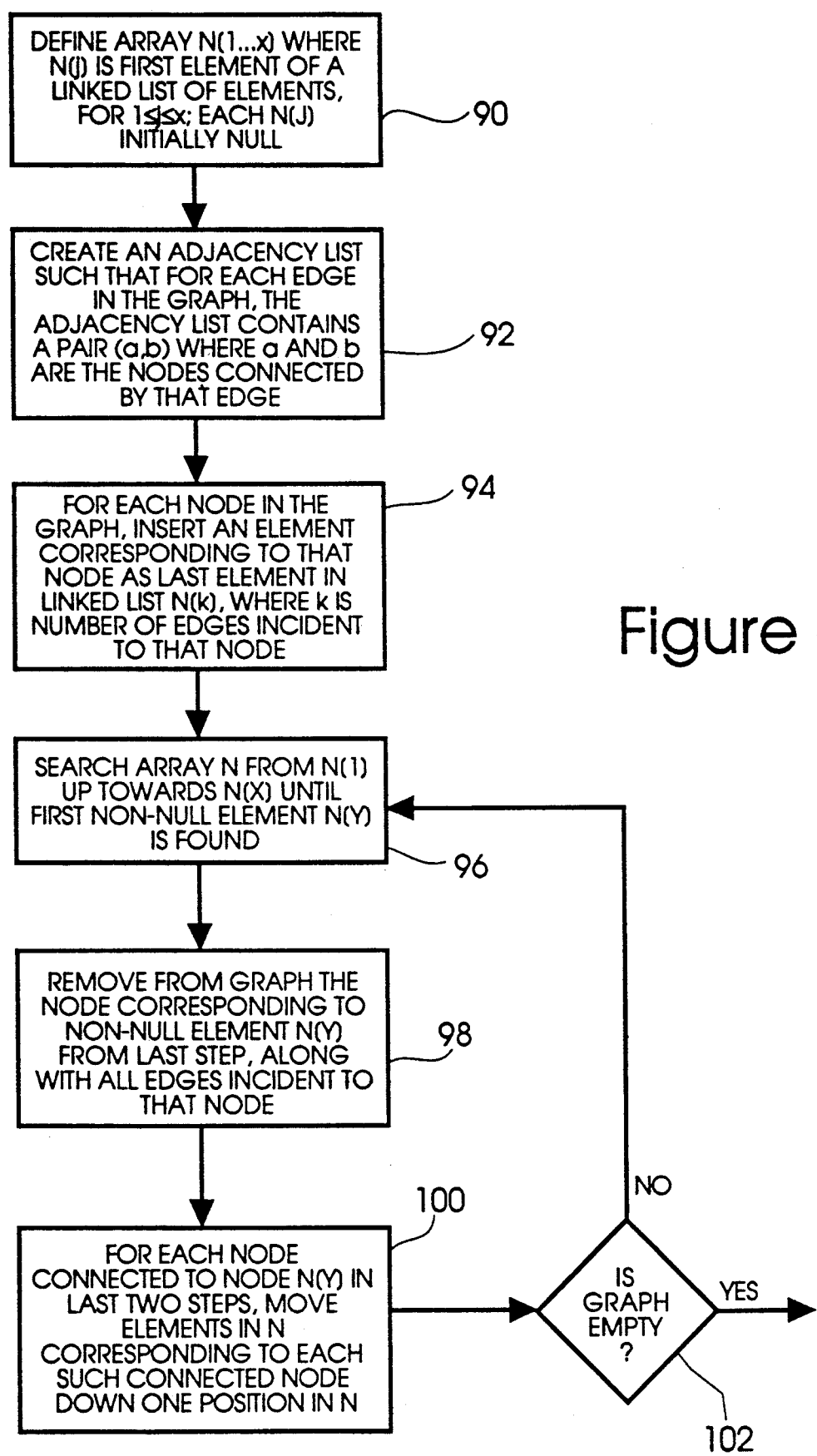
FIG. 6 is a flow diagram illustrating the sub-steps involved in the step of removing nodes shown in the flow diagram of FIG. 4.

The simplification steps (1), (2), and (3) above are depicted in the flow diagram in FIG. 6. In FIG. 6, blocks 90 and 92 correspond to the array definition step (1) and the adjacency list definition step (2) above. Block 94 corresponds to the creation of array N from the interference graph. Blocks 96, 98, and 100 in FIG. 6 correspond to step (3) above, in which nodes, along with the edges incident thereto, are removed from the list in order of increasing degree. In block 102, it is determined whether the graph is empty. If not, the steps of blocks 96 98, and 100 are repeated until the last node has been removed.

This simplification step differs from that of the prior art method represented in FIG. 1 in that instead of removing any node that has degree less than or equal to the number of colors, at each step, the remaining node with the lowest degree is removed. Since, according to step (1) above, each node is originally in a position indexed by the number of edges incident upon it, the search in step (3) that removes a node will take no more steps than the degree of the node removed. The total cost of searching is, therefore, bounded by the sum of the degrees of every node in the graph, which is exactly equal to twice the number of edges in the graph. Since every other step in (3) can be done in constant time, the total cost, and therefore the total execution time of this procedure, is linear in the size of the interference graph.

In addition, the search in step (3) above for the first nonnull cell can be shortened further by noting that if a node m is removed from N[j] where j is greater than zero, the next search can start at N[j-1], rather than at N[0]. Because node m with degree j has been removed, the degree of each of its neighbors is reduced by exactly one. This may create a node of degree (j-1), but it cannot create a node of lower degree. Thus, N[k] must still be empty for k between zero and (j-1).

Once all of the nodes have been removed in block 62 of FIG. 4, the coloring phase is begun. In block 66, the allocator rebuilds the graph by re-inserting each node and its associated edges in the reverse of the order of deletion. As each node is inserted, it is colored with the first color that does not appear in any of its neighbors. Applying this method to the graph of FIG. 3, for example, yields the following results: Initially, all nodes in FIG. 3 are of degree 2. Execution of block 62 from FIG. 4 results first in node 44 (or any of the nodes, since all are initially of degree 2) being removed, along with edges 52 and 54; this reduces the degree of nodes 46 and 48 to one. Next, node 46 (or node 48, since both are of degree one) is removed, along with edge 56; this reduces node 50 to degree one. Next, node 48 (or node 50, since both are now of degree one) is removed, along with edge 58. Finally, node 50, now of degree zero, is removed.

In block 66 of FIG. 4, the graph of FIG. 3 is now colored and rebuilt. Node 50 and edges 56 and 58 are reinserted, and assigned a first color. Next, node 48 is reinserted, along with edge 54, and assigned a second color. Then node 46 is inserted, along with edge 52. Node 46 may be colored the same as node 48, since there is no edge between them. Lastly, node 44 is reinserted, and assigned the first color. Thus, the scheme depicted in FIG. 4 achieves a two-coloring of graph 42 of FIG. 3, where the scheme depicted in FIG. 1 failed to do so.

In the foregoing example, the graph of FIG. 4 was two-colored, and no spilling was required. When the coloring phase represented by block 66 of FIG. 4 encounters a node that already has neighbors with each of the possible colors, the allocator must spill that node. In accordance with the present invention, this eventuality is handled by causing the node to be reinserted without assigning a color to the node. The allocator continues to reinsert the rest of the nodes and giving them colors where possible. After the entire graph has been rebuilt, the allocator inserts spill code, as represented by block 64 in FIG. 4. Then the allocator returns to block 60 and completely rebuilds the interference graph, and returns to the simplification phase represented by block 62.

Deferring the decision to spill nodes until after coloring in block 66, as opposed to spilling nodes immediately after simplification as in the prior art scheme of FIG. 1 constitutes an improvement in the coloring scheme, since when the allocator inserts a node that has k or more neighbors, two or more of them may have the same color, leaving a color available for that node. Known allocators of the prior art have failed to take advantage of this possibility, and look merely to the degree of a node, not to the colors assigned to its neighbors.

In the register allocation scheme just described with reference to FIG. 4, no notion of spill cost is taken into account. Since the allocator represented by FIG. 4 looks only at the degree of a node, spill decisions are made without any estimate of their run-time impact. Such an approach would produce arbitrary allocations and could possibly lead to undesirable performance.

In order to incorporate an ordering of nodes being colored corresponding to the relative costs associated with spilling, the allocation scheme of the present invention finds nodes with the minimum ratio of spill cost to degree and removes those nodes first In particular, in accordance with the present invention, when simplifying the interference graph as represented by block 62 in FIG. 4, the allocator removes the nodes with fewer neighbors than the number of possible colors in arbitrary order, but for nodes having more than this number of neighbors, the nodes having the minimum ratio of spill cost to degree are removed first. Ordering the nodes in this manner determines the order in which the allocator colors nodes in block 66 of FIG. 4 in the neighborhood of a possible spill. Additionally, if the allocator is forced to spill, it will spill the same live range that the prior art allocator would spill.

Thus, the allocator of the present invention will spill either a subset of the live ranges that the prior art allocator would spill, or the same set. By implication, therefore, the allocator of the present invention always allocates registers at least as efficiently as the prior art allocators, and in some cases, more efficiently.

Figure 5:
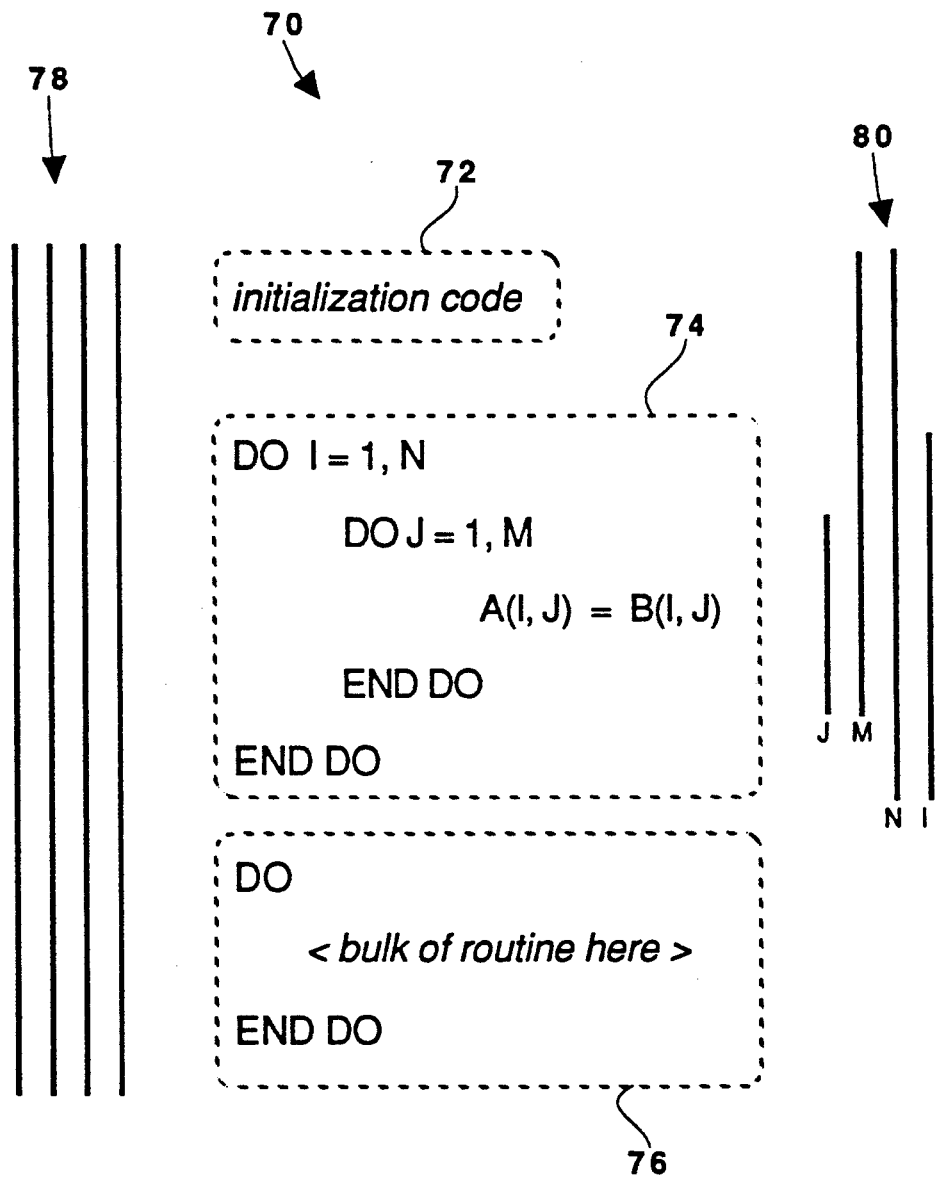
FIG. 5 is a computer program routine having the live ranges of its variables indicated therein.

As a further example of the operation of an allocator in accordance with the present invention, consider the computer routine whose structure is illustrated in FIG. 5. The routine, which is designated generally as 70 in FIG. 5, consists of some initialization code, designated by dashed line 72, followed by a small, doubly-nested loop within dashed line 74 that implements a simple array copy procedure. The rest of the routine 70, designated by dashed line 76 consists of three large, complex loop nests that do the bulk of the work of the routine 70. The routine 70 of FIG. 5 is a simplified version of a single-value decomposition (SVD) routine such as would be known to one reasonably skilled in applied mathematics, numerical analysis, or computer science.

In FIG. 5, the live ranges of routine 70 are indicated by the vertical lines extending alongside the code. After optimization, there are about a dozen long live ranges, designated collectively as 78 in FIG. 5 which extend from the initialization portion 72, through the array copy section designated 74, and into the large loop nests 76.

Consider first the prior art allocation scheme represented by the flow diagram of Figure 1. During the coloring phase, corresponding to block 16 in FIG. 1, the dozen or so live ranges 78 restrict the interference graph of routine 70 so much that some registers must be spilled. Considering the computed spill costs, it is likely cheaper to spill the live ranges designated as 80 corresponding to the loop indices and limits for the array copy loop 74, including the values I, J, M, and N, than the longer live ranges 78. However, spilling the live ranges 80 in loop 74 does not lower the demand for registers exerted by the large loop nests 76, so more live ranges must be spilled. After this has been done, most of the longer live ranges have been spilled, and coloring proceeds.

Due to the behavior just described, the SVD routine when compiled using a register allocator of the prior art has almost no register utilization in the array copy loops 74. This is because based on the low cost of spilling the live ranges 80 for the array copy loop 74, these values are spilled first; but when the prior art allocator determines that the register pressure exerted by the long live ranges 78 has not been alleviated by spilling the array copy loop values, the array copy loop values are not un-spilled. The result, therefore, is an exceptional amount of spill code that must be inserted into routine 70.

Consider now the treatment of the SVD routine 70 of FIG. 5 by the allocator of the present invention, represented by the flow diagram of FIG. 4. In this case, as nodes are removed from the graph, the nodes for the live ranges 80 are removed relatively early, since these nodes have relatively low ratios of spill cost to degree due to their relatively short lives compared with live ranges 78. In the allocation scheme of the present invention, however, no spill code is added prior to coloring. The simplification phase represented by block 62 in FIG. 4 continues until the graph is empty. Then, when inserting the nodes back into the graph during the coloring phase represented by block 66, the coloring phase is forced to leave some of the nodes corresponding to live ranges 78 uncolored. When the allocator of the present invention then reaches the live ranges 80 of the smaller loop nests 74, it still has available registers due to the spilling of some of the longer live ranges 78, and the live ranges 80 may be assigned registers.

Thus, the allocator of the present invention utilizes registers more effectively because longer live ranges 78 were spilled. This result is achieved as a result of the allocator in the coloring phase 66 of FIG. 4 being able to "clean up" bad decisions made in the simplification phase 62. The spilling of longer live ranges reduced the register pressure throughout the SVD routine 70. The short live ranges 80 could then be allocated registers The values that get assigned registers under the allocation scheme of the present invention tend to have shorter live ranges. Deferring the decision to spill nodes until after coloring allows such short live ranges to be assigned registers, while as previously noted these live ranges are spilled by the allocation scheme of the prior art.

As previously noted, the allocation scheme of the present invention is executable in time linearly proportional to the size of a given interference graph, which is the same asymptotic bound achieved by the prior art. The time spent in a single execution of the graph building phase, represented by block 60 in FIG. 4 or by block 10 in FIG. 1 is the same for the allocator of the prior art and for the allocator in accordance with the present invention. The amount of time spent generating spill code generally depends on the number of live ranges spilled; this time will vary somewhat depending upon the number of individual register loads and memory stores that must be inserted for a particular live range. That minor difference is factored out, however, by the fact that the allocation scheme of the present invention spills either the same set or a subset of the live ranges spilled by prior art allocation schemes such as that represented by the diagram of FIG. 1.

In the event that no spill code is needed, allocators of the prior art and an allocator in accordance with the present invention will execute in time linear in the number of live ranges plus interferences. If the simplification phase reaches a point where each remaining node has as many or more neighbors than possible colors, the prior art allocator which removes nodes of higher degree in ascending order will run in linear time. However, an allocation scheme which employs spill cost analysis must examine spill costs in this situation, in order to find the node with minimum estimated cost. A simple implementation in accordance with one embodiment of the present invention would be simply to examine the spill cost for all remaining nodes; although this process would take time proportional to the square of the number of nodes spilled, this time bound is acceptable since the number of nodes spilled is usually much less than the total number of nodes. Another embodiment of the present invention employs a heap, as would be known to one of ordinary skill in the computer science art, to reduce the time spent finding spill costs; in either embodiment, the performance time is linearly or nearly linearly bounded.

Thus, if no spill code is necessary, both the allocator of the prior art and that in accordance with one embodiment of the present invention run in time linear with the size of the graph. If spill code must be generated, the results from the allocator of the present invention will vary from case to case as compared to that of the prior art, but in both cases the asymptotic complexity is the same.

From the foregoing description of a specific embodiment of the present invention, it should be apparent that a register allocator based on a graph coloring model has been disclosed which executes in linear time in the size of a given interference graph and which produces efficient register utilization. Deferring the spilling of live ranges until after the coloring phase, and analyzing spill costs in order to choose spill candidates enables the allocator of the present invention to assign more expensive nodes first, thereby reducing the overall cost of spilling.

While this invention has been described with reference to a specific embodiment, this description is not meant to be construed in a limiting sense. Various modifications and alterations of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A machine-executed method for allocating a plurality R of internal registers of a computer for the storage of a plurality of values to be defined and reference during execution of a program by said computer, wherein each one of said plurality of values is "live" during a particular portion of the execution of said program, said particular portion being referred to as a "live range" of said each one value, and wherein two lives range overlapping is referred to as an "interference", the method comprising the steps of:
    (a) constructing an interference graph having one node for each live range of said program and an edge for each interference between two live ranges;
    (b) assigning one of R distinct colors to each node in said graph such that no two of said nodes which are connected by one of said edges are assigned the same one of said R colors, leaving any given nod uncolored when said given node cannot be assigned a color different from all others of nodes which are connected to said given node;
    (c) for each node left uncolored in step (b), modifying said program such that certain ones of said live ranges corresponding to said uncolored nodes are transformed into a plurality of smaller live ranges;
    (d) repeating steps (a) through (c) above until no nodes in said interference graph are left uncolored in step (b);
    (e) assigning each one of said R colors to a unique one of said R registers, the assignment of a particular one of said R colors to a particular one of said R registers signifying that a value whose live range was represented in step (a) by node to which said particular one of said R colors was assigned in step (b) above will be stored in said particular register.

2. The method of claim 1, wherein the step 1(b) of assigning one of R colors to each node in said graph comprises the sub-steps of:
    (1) removing all nodes from said graph having fewer than R edges incident upon them in arbitrary order, along with all edges incident to said removed nodes;
    (2) when only nodes having R or more edges incident thereto remain in said graph, removing said nodes and edges incident thereto in ascending order of the ratio of estimated spill cost to degree of each of said remaining nodes, where spill cost for a given node is estimated based on a number of modifications to said computer program required to transform a live range corresponding to said given node into a plurality of smaller live ranges and on the locations of said modifications in said program, and where said degree of a given node is the number of edges incident upon said given node;
    (3) re-inserting each of said nodes into said interference graph, along with corresponding edges incident thereto, in reverse order of said nodes' removal, such that as each one node is re-inserted into said graph, said one node is assigned one of said R distinct colors that is different from any color assigned to any node that is connected to said one node via an edge, and such that any re-inserted node having edges incident thereto which connect said re-inserted node to nodes of each of said R distinct colors is left uncolored.

3. The method of claim 2, wherein said step 1(b)(1) of removing nodes having fewer than R edges incident thereto and said step of removing nodes having R or more edges incident thereto further comprising the steps of:
    (A) defining an array N having x elements N through N, such that each element N of array N is the first element of a jth one of x lists of elements and such that each element N is a null element if said jth one of said x lists is empty;
    (B) for each one node in said interference graph, said one node having k edges incident thereto, inserting an element corresponding to said one node as the last element in a kth one of said x lists of elements, wherein said kth one of said x lists is a list of elements corresponding to nodes having k edges adjacent thereto;

(C) searching said array N starting from N and moving toward N until a first non-null element N is found;

(D) removing from said interference graph a node having y edges incident thereto those corresponding element in one of said x lists was part of the list of elements starting with N, where N was the first non-null element found in array N in steps 1(b)(1)(C), and removing from said interference graph all of said y edges incident to said removed node;

(E) identifying the nodes which were connected to said removed node from step 1(b)(1)(D) by an edge in said interference graph prior to removing said removed node in step 1(b)(1)(D);

(F) for each one of the nodes identified in step 1(b)(3)(E), moving said element corresponding thereto of said ascertained node in array N one step downward, such that for each one of said identified nodes that is in an ith one of said x lists, said element corresponding to said identified node is moved to an (i-1)th one of said x lists;

(G) repeating steps 1(b)(3)C) through (1(b)(3)(F) until said all nodes and edges have been removed from said interference graph.

4. The method of claim 3, wherein said step 1(b)(1)(E) of identifying comprises the step of traversing an adjacency list which identifies pairs of nodes in said interference graph that are connected via an edge, to identify all pairs in said adjacency list in which said removed node is a member.

5. A machine-executed method for allocating the use during execution of a program of a fixed number R of registers in a computer, such that any two values defined by said program whose live ranges overlap are not stored in the same one of said registers, comprising the steps of:

(a) constructing a graph having nodes and edges therein, wherein each node corresponding to one live range of a value defined by sad program, and wherein each edge between two nodes in said graph in said graph represents an overlap of the live ranges corresponding to said two nodes;

(b) performing an R-coloring of said interference graph wherein for each one node in the graph, a color is assigned to said one node which differs from any color assigned to any node connected to said one node by an edge, and wherein any node having R or more nodes connected thereto by an edge is left uncolored;

(c) for each node left uncolored in step (b), inserting spill code instructions into said computer program to split the live range corresponding to said uncolored node into a plurality of shorter live ranges;

(d) repeating steps (a) through (c) until no node is left uncolored in step (b).

6. The method according to claim 5, wherein the step 6(b) of R-coloring said interference graph comprises the sub-steps of:

(1) removing all nodes from said graph having fewer than R edges incident upon them in arbitrary order, along with all edges incident to said removed nodes;

(2) when only nodes having R or more edges incident thereto remain in said graph, removing said nodes and edges incident thereto in ascending order of the ratio of estimated spill cost to degree, where spill cost for a given node is estimated based upon the amount of spill code required to spill said given node weighted by the loop nesting depth of points where said spill code must be inserted, and where said degree of a given node is the number of edges incident upon it;

(3) re-inserting each of said nodes into said interference graph, along with corresponding edges incident thereto, in reverse order of said nodes' removal, such that as each one node is re-inserted into said graph, it is assigned one of R possible colors that is different from any color assigned to any node that is connected to said one node via an edge, and such that any re-inserted node having edges incident thereto which connect said re-inserted node to nodes of each of said R possible colors is left uncolored.

7. The method of claim 6, wherein said step 6(b)(2) of removing nodes having fewer than R edges incident thereto and said step of removing nodes having R or more edges incident thereto further comprise the steps of:

(A) defining an array N having x elements N through N, such that each element N of array N is the first element of a jth one of x lists of elements and such that each element N is a null element if said jth list is empty;

(B) for each one node in said interference graph, said one node having k edges incident thereto, inserting an element corresponding to said one node as the last element in a kth one of said x lists of elements, wherein said kth one of said x lists is a list of elements corresponding to nodes having k edges adjacent thereto;

(C) searching said array N starting from N and moving toward N until a first non-null element N is found;

(D) removing from said interference graph a node having y edges incident thereto those corresponding element was part of the list of elements starting with N, where N was the first non-null element found in array N is step 6(b)(2)(C), and removing from said interference graph all of said y edges incident to said removed node;

(E) identifying the nodes which were connected to said removed node from step 6(b)(2)(D) by an edge in said interference graph prior to removing said removed node in step 6(b)(2)(D);

(F) for each one of the nodes identified in step 6(b)(2)(E), moving said element corresponding to said ascertained node in array N one step downward, such that for each one of said identified nodes that is in an ith one of said x lists, said element corresponding to said identified node is moved to an (i-1)th one of said x lists;

(G) repeating steps 6(b)(2)C) through (6(b)(2)(F) until said all nodes and edges have been removed from said interference graph.

8. The method of claim 7, wherein said step 6(b)(2)(E) of identifying comprises the step of traversing an adjacency list identifying pairs of nodes in said interference graph that are connected via an edge, to identify all pairs in said adjacency list in which said removed node is a member.

* * * * *

UNITED STATES PATENT AND TRADEMARK OFFICE
CERTIFICATE OF CORRECTION

PATENT NO. : 5,249,295
DATED : September 28, 1993
INVENTOR(S) : Briggs et al

It is certified that error appears in the above-indentified patent and that said Letters Patent is hereby corrected as shown below:

On title page, item [57] Abstract, fifth line from top of paragraph "a interference" should read --an interference--.

At column 2, line 44, "will be subsequently be" should read --will subsequently be--.

At column 3, line 6, "'spill38" should read --"spill out"--.

At column 9, line 20, after "first" a period should be inserted.

In claim 1, at column 11, line 59, "reference" should read --referenced--.

In claim 1, at column 11, line 65, "lives range" should read --live ranges--.

In claim 1(b), at column 12, line 8, after "of" should be inserted --said--.

In claim 3, at column 12, line 57, "comprising" should read --comprise--.

In claim 5(a), at column 13, line 42, "sad" should read --said--.

UNITED STATES PATENT AND TRADEMARK OFFICE
CERTIFICATE OF CORRECTION

PATENT NO. : 5,249,295
DATED : September 28, 1993
INVENTOR(S) : Briggs et al

It is certified that error appears in the above-indentified patent and that said Letters Patent is hereby corrected as shown below:

Column 13, claim 5(a), line 43 and 44, delete the second occurrance of the phrase "in said graph".

Signed and Sealed this

Fourteenth Day of June, 1994

Attest:

BRUCE LEHMAN

*Attesting Officer*  *Commissioner of Patents and Trademarks*